US012600408B2

(12) United States Patent
Takesaki

(10) Patent No.: US 12,600,408 B2
(45) Date of Patent: Apr. 14, 2026

(54) TURNING CONTROL DEVICE

(71) Applicant: DENSO CORPORATION, Kariya-city (JP)

(72) Inventor: Akira Takesaki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 346 days.

(21) Appl. No.: 18/359,721

(22) Filed: Jul. 26, 2023

(65) Prior Publication Data

US 2023/0373560 A1 Nov. 23, 2023

Related U.S. Application Data

(63) Continuation of application No. PCT/JP2022/001982, filed on Jan. 20, 2022.

(30) Foreign Application Priority Data

Jan. 29, 2021 (JP) ................................. 2021-013298

(51) Int. Cl.
*B62D 7/15* (2006.01)
*B62D 6/00* (2006.01)
(52) U.S. Cl.
CPC .................................... *B62D 7/159* (2013.01)
(58) Field of Classification Search
CPC . B62D 7/15; B62D 7/159; B62D 5/04; B62D 6/00; B62D 7/14
See application file for complete search history.

(56) References Cited

U.S. PATENT DOCUMENTS

| | | | |
|---|---|---|---|
| 2005/0096830 A1* | 5/2005 | Ohta | ........................ B60T 8/172 701/1 |
| 2006/0015236 A1* | 1/2006 | Yamaguchi | .......... B60K 17/358 180/242 |
| 2012/0016646 A1* | 1/2012 | Takenaka | ................ B60T 8/172 703/2 |
| 2020/0262478 A1* | 8/2020 | Sato | ..................... B62D 15/021 |

FOREIGN PATENT DOCUMENTS

JP 2019-130958 A 8/2019

* cited by examiner

*Primary Examiner* — Tan Q Nguyen
(74) *Attorney, Agent, or Firm* — Precision Patents, P.C.

(57) ABSTRACT

A turning control device is for a vehicle having four wheels that are mechanically separated and steered independently. The four wheels are left and right wheels of a front row and a rear row. The turning control device controls four steering actuators corresponding to the four wheels. The turning control device includes a controller that performs feedback control of the four steering actuators to reduce a deviation for each of the four wheels. The deviation is a difference between a state parameter convertible into a turning angle and a target value of the state parameter set according to steering of a steering wheel. The controller executes a responsiveness changing process of changing a responsiveness of the feedback control so that the deviation is likely to be smaller in a vehicle straight traveling state than in a vehicle non-straight traveling state.

8 Claims, 8 Drawing Sheets

VEHICLE SPEED SENSITIVE GAIN MAP

TURNING ANGLE SENSITIVE GAIN MAP

STOP STATE OR STEERING STATE

FIRST COMPARATIVE EXAMPLE

OK

SECOND COMPARATIVE EXAMPLE

NG

EXAMPLE

OK

TURNING CONTROL DEVICE

CROSS REFERENCE TO RELATED APPLICATIONS

The present application is a continuation application of International Patent Application No. PCT/JP2022/001982 filed on Jan. 20, 2022, which designated the U.S. and claims the benefit of priority from Japanese Patent Application No. 2021-013298 filed on Jan. 29, 2021. The entire disclosures of all of the above applications are incorporated herein by reference.

TECHNICAL FIELD

The present disclosure relates to a turning control device.

BACKGROUND

A controller performs feedback control of a turning angle of a wheel.

SUMMARY

According to at least one embodiment, a turning control device is for a vehicle having four wheels that are mechanically separated and steered independently. The four wheels are left and right wheels of a front row and a rear row. The turning control device controls four steering actuators corresponding to the four wheels. The turning control device includes a controller. The controller performs feedback control of the four steering actuators to reduce a deviation for each of the four wheels. The deviation is a difference between a state parameter convertible into a turning angle and a target value of the state parameter set according to steering of a steering wheel. The controller executes a responsiveness changing process of changing a responsiveness of the feedback control so that the deviation is likely to be smaller in a vehicle straight traveling state than in a vehicle non-straight traveling state, except when the vehicle satisfies a predetermined application exclusion requirement.

BRIEF DESCRIPTION OF DRAWINGS

The details of one or more embodiments are set forth in the accompanying drawings and the description below. Other features and advantages will be apparent from the description and drawings, and from the claims. In the drawings:

DETAILED DESCRIPTION

Figure 1:
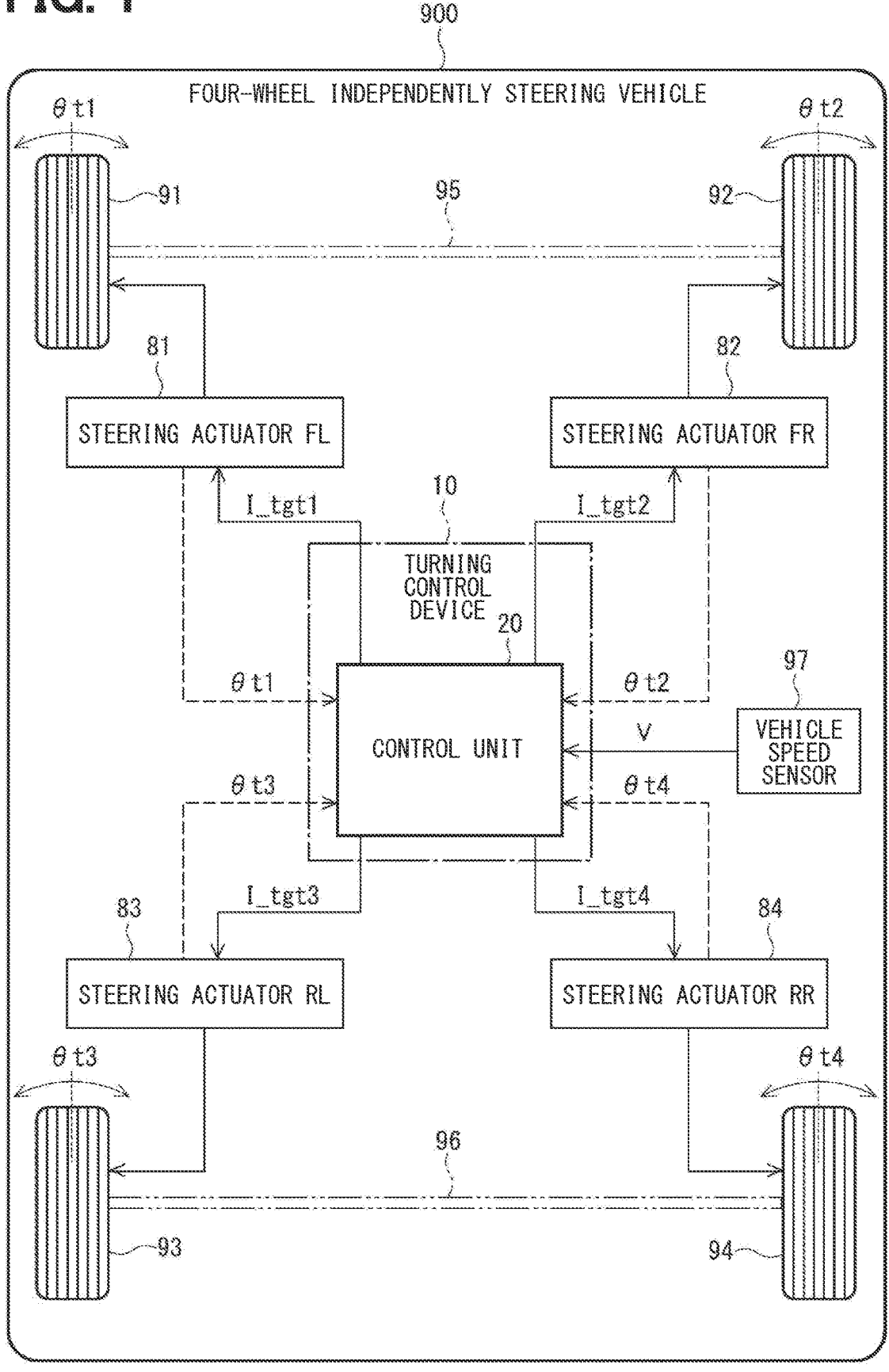
FIG. 1 is a schematic diagram of a four-wheel independently steering vehicle on which a turning control device according to each embodiment is mounted.

To begin with, examples of relevant techniques will be described.

Conventionally, a controller that performs feedback control of a turning angle of a turning wheel is known. For example, a controller for a steer-by-wire steering device disclosed in a comparative example has an issue of reducing occurrence of deflection of a vehicle due to a deviation between a neutral position of the turning angle and the turning angle when a vehicle is traveling straight. A turning control device of the controller limits a proportional term and an integral term obtained based on an angle deviation of the feedback control so that the angle deviation is less likely to be small when the vehicle is traveling straight as compared to when the vehicle is not traveling straight.

The controller of the comparative example is applied to a vehicle in which left and right wheels of a front row or a rear row are mechanically connected, and one of the left and right wheels of the front and rear rows has a straight turning angle. Since the turning angle is set to an angle at which the vehicle travels straight as a neutral position, the controller limits the integral term of the feedback control so that the deviation does not become zero when there is a deviation between the target turning angle at which the vehicle is traveling straight and an actual turning angle.

Contrary to this, in a four-wheel independently steering vehicle in which four wheels can be steered independently, both of wheels in the front and rear rows do not mechanically have the straight turning angle, and the turning angle of each of the wheels at the time of straight traveling does not always become the neutral position. Therefore, technology of the comparative example having a different premise does not apply to the four-wheel independently steering vehicle. In addition, when a steering system of the four-wheel independently steering vehicle is controlled to reduce the deviation between the target turning angle and the actual turning angle, responsiveness at the time of normal steering is enhanced. Therefore, an overshoot of the turning angle occurs at the time of sudden steering or the like, and the vehicle behaves in an unstable manner.

In contrast to the comparative example, according to a turning control device of the present disclosure, an occurrence of vehicle deflection during straight traveling while avoiding the vehicle from becoming unstable at the time of sudden steering in turning angle control of a four-wheel independently steering vehicle can be reduced.

According to one aspect of the present disclosure, a turning control device is for a vehicle having four wheels that are mechanically separated and steered independently. The four wheels are left and right wheels of a front row and a rear row. The turning control device controls four steering actuators corresponding to the four wheels. The turning control device includes a controller. The controller performs feedback control of the four steering actuators to reduce a deviation for each of the four wheels. The deviation is a difference between a state parameter convertible into a turning angle and a target value of the state parameter set according to steering of a steering wheel. The controller executes a responsiveness changing process of changing a responsiveness of the feedback control so that the deviation is likely to be smaller in a vehicle straight traveling state than in a vehicle non-straight traveling state, except when the vehicle satisfies a predetermined application exclusion requirement.

In a four-wheel independently steering vehicle, in order to avoid vehicle deflection during straight traveling, control is necessary to perform with high accuracy so that the turning angle deviation converted into a steering angle deviation does not remain. However, if responsiveness is increased in order to perform control with high accuracy, an overshoot may occur at the time of sudden steering or the like due to the influence of gear backlash, tire friction, or the like, and the vehicle may become unstable.

Therefore, in the present disclosure, the controller determines whether the vehicle is in the vehicle straight traveling state, and changes the responsiveness of the feedback control so that the state parameter deviation is likely to be reduced only when it is determined that the vehicle is in the vehicle straight traveling state. Thus, in the present disclosure, in the turning angle control of the four-wheel independently steering vehicle, the occurrence of the vehicle deflection at the time of the straight traveling can suppress while avoiding the vehicle from becoming unstable at the time of sudden steering or the like.

Hereinafter, a plurality of embodiments of a turning control device will be described with reference to the drawings. The turning control device of the present embodiment is a device that controls four steering actuators corresponding to respective wheels in a four-wheel independently steering vehicle. In the four-wheel independently steering vehicle, left and right wheels in a front row and a rear row are mechanically separated from each other, so that the four-wheel independently steering vehicle can be steered.

With reference to FIG. 1, a configuration of the four-wheel independently steering vehicle 900 on which a turning control device according to each embodiment is mounted will be described. The four-wheel independently steering vehicle 900 has four wheels 91 to 94 that are mechanically separated and steered independently. The four wheels 91 to 94 are left and right wheels of a front row and a rear row. In the four-wheel independently steering vehicle 900, the left and right wheels 91, 92 in the front row and the left and right wheels 93, 94 in the rear row are both mechanically separated. That is, at least one of a rack bar 95 connecting the left and right wheels in the front row and a rack bar 96 connecting the left and right wheels in the rear row is provided in a normal vehicle, whereas the rack bars 95, 96 are not provided in both the front and rear rows in the four-wheel independently steering vehicle 900. Two-dot chain lines in FIG. 1 indicate that there are no rack bars 95, 96. Accordingly, the four wheels 91 to 94 can be steered independently.

Four steering actuators 81 to 84 are provided corresponding to the wheels 91 to 94. The steering actuator FL 81 and the steering actuator FR 82 correspond to the left and right wheels 91, 92 in the front row, respectively. The steering actuator RL 83 and the steering actuator RR 84 correspond to the left and right wheels 93, 94 in the rear row, respectively. The steering actuators 81 to 84 may be typically configured by a motor, and may be configured by a linear actuator or the like.

The steering actuators 81 to 84 is driven by target currents Itgt1 to Itgt4 supplied from the control unit 20 of the turning control device 10, and turns the corresponding wheels 91 to 94. The turning angle of each of the wheels 91-94 is expressed as θt1 to θt4. The turning angles θt1 to θt4 are defined such that a neutral position is 0, a counterclockwise rotation is positive, and a clockwise rotation is negative, for example. Actual turning angles θt1 to θt4 may be directly detected or may be calculated based on an operation amount of the steering actuators 81 to 84. In the present embodiment, the turning angles θt1 to θt4 themselves will be described as "a state parameter that can be converted into a turning angle".

The turning angles θt1 to θt4 as the state parameter is fed back to the control unit 20 as indicated by broken lines in FIG. 1. The control unit 20 of the present embodiment acquires vehicle speed V from a vehicle speed sensor 97. Conventionally, in a vehicle in which left and right wheels in a front row or a rear row are mechanically coupled to each other and one of the left and right wheels in a front row or a rear row has a straight turning angle, a technique of performing feedback control of a turning angle of wheels is known. However, in the four-wheel independently steering vehicle 900, both of the wheels 91 to 94 in the front and rear rows do not mechanically have a straight turning angle, and the turning angles of each of the turning wheels at the time of straight traveling does not always become a neutral position. Therefore, the conventional technology having a different premise cannot be applied to the four-wheel independently steering vehicle 900.

In order to avoid vehicle deflection at the time of straight traveling in the four-wheeled independent turning wheel-equipped vehicle 900 in which the left and right wheels are not mechanically connected, control with high accuracy is necessary so that a turning angle deviation does not remain. However, if responsiveness is increased in order to perform the control with high accuracy due to the influence of gear backlash, tire friction, or the like, there is an issue that overshoot occurs at the time of sudden steering or the like and the vehicle becomes unstable. Therefore, the control unit 20 of the present embodiment performs appropriate feedback control of the turning angles θt1 to θt4 of the wheels 91-94 in the four-wheel independently steering vehicle 900.

Next, a specific configuration of the control unit 20 will be described as a first embodiment and a second embodiment. Matters common to the control units of the first embodiment and the second embodiment will be described as a "control unit 20 of the present embodiment". When control configurations of the respective embodiments are described separately with reference to FIGS. 2 and 9, the control unit of the first embodiment is denoted by "201", and the control unit of the second embodiment is denoted by "202".

First Embodiment

Figure 2:
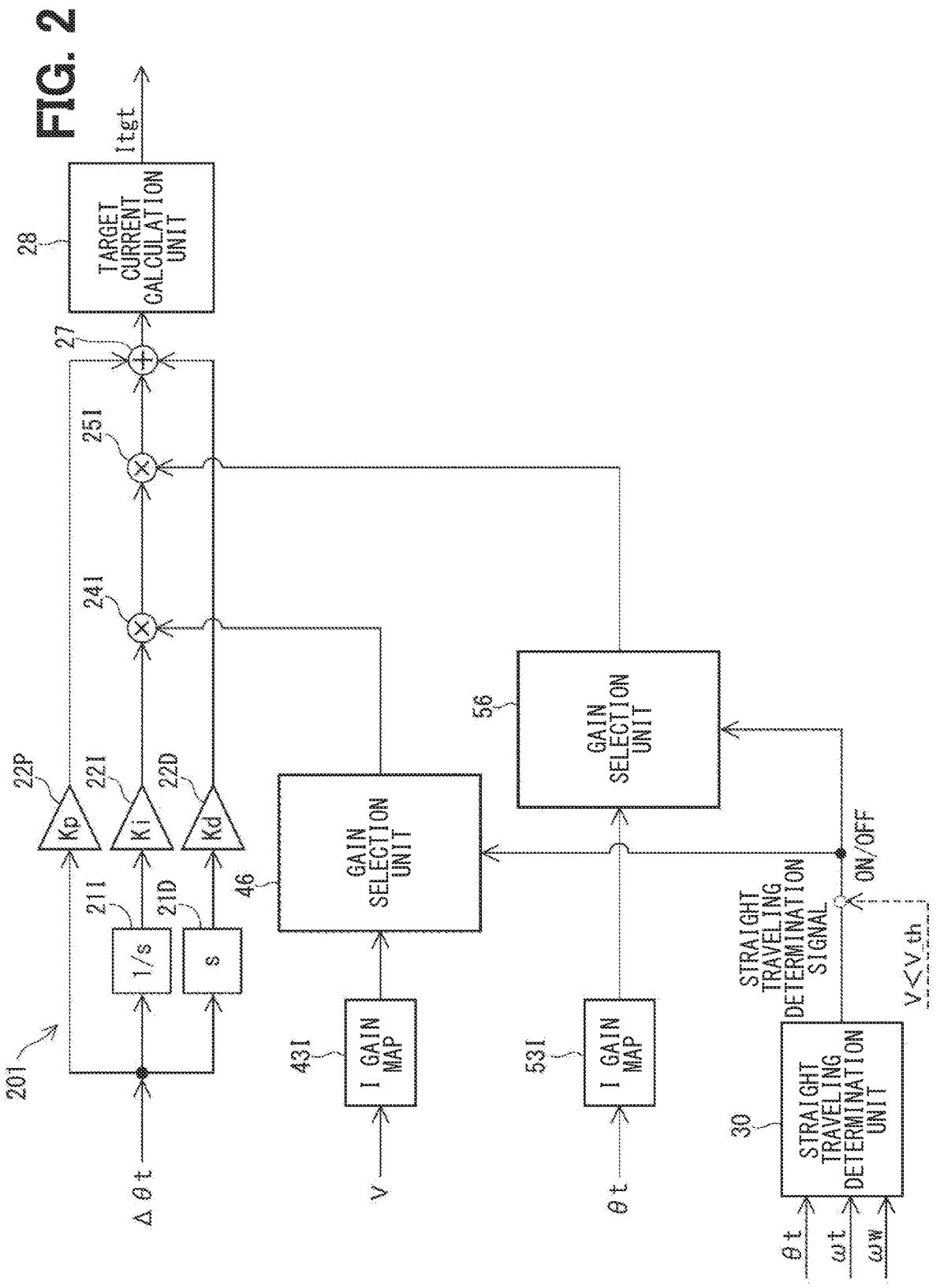
FIG. 2 is a configuration diagram showing a controller of the turning control device according to a first embodiment.

A configuration of the control unit 201 according to the first embodiment will be described with reference to FIG. 2. The control unit 201 of the first embodiment includes 4 sets of the control configuration of FIG. 2 for each steering actuators 81 to 84 corresponding to each wheels 91 to 94. In FIG. 1, symbols of the turning angles of each of the wheels 91 to 94 are individually described as θt1 to θt4, but in the following description, the control configuration of the turning angles for each of the wheels 91 to 94 is the same. Therefore, the turning angles θt1 to θt4 of the wheels 91 to 94 are collectively referred to as "θt". The same applies to turning angular velocity ωt, wheel speed ωw, and the like. In FIG. 2, an integral gain is referred to as "I gain".

The control unit 201 illustrated in FIG. 2 includes a proportional controller 22P, an integral controller 22I, and a differential controller 22D, and performs PID control. A turning angle deviation Δθt that is a difference between the actual turning angle and the target turning angle that are fed back is input to the control unit 201. The actual turning angle corresponds to a "parameter convertible into a turning angle". The target turning angle corresponds to a "target value of state parameter set according to the steering of the steering wheel". The turning angle deviation Δθt corresponds to a "state parameter deviation". The control unit 201 performs feedback control of the steering actuators 81 to 84 by the controllers 22P, 22I, 22D so as to reduce the turning angle deviation Δθt.

The proportional controller 22P calculates a proportional term proportional to the turning angle deviation Δθt. The integral controller 22I calculates an integral term proportional to an integral value of the turning angle deviation Δθt calculated by an integrator 21I. The differential controller 22D calculates a differential term proportional to a differential value of the turning angle deviation Δθt calculated by a differentiator 21D. The control unit 201 may have a configuration of PI control not including differential control, and in this case, it is similarly interpreted that the differentiator 21D and the differential controller 22D are not provided.

An adder 27 adds the proportional term, the integral term, and the derivative term, which are control terms of the feedback control, and outputs a result to the target current calculation unit 28. The target current calculation unit 28 calculates a target current Itgt based on an addition value of the control term and outputs the target current Itgt to the corresponding steering actuators 81 to 84. The target current Itgt and the turning angle θt of the wheels 91 to 94 have a positive correlation.

The control unit 201 includes multipliers 24I, 25I that multiply an output of the integral controller 22I by integration gains selected by gain selection units 46, 56. That is, a value obtained by multiplying the output of the integral controller 22I by the integration gains are input to the adder 27 as the integration term. The control unit 201 includes a straight traveling determination unit 30 that determines whether the vehicle is in a straight traveling state. The straight traveling determination unit 30 determines the vehicle straight traveling state based on at least the turning angle θt of each of the wheels 91 to 94. More specifically, the straight traveling determination unit 30 determines that the vehicle is in the vehicle straight traveling state when an absolute value |θt| of the turning angle is equal to or less than a straight traveling determination threshold. In addition, the straight traveling determination unit 30 may determine the vehicle straight traveling state based on an integral value of the turning angular velocity ωt or a difference between wheel velocities ωw of the left and right wheels.

The independently steering vehicle may travel straight in a toe-in state or a toe-out state. In the toe-in state, the front ends of the left and right wheels face symmetrically inward, and in the toe-out state, the front ends of the left and right wheels face symmetrically outward. In this case, the straight traveling determination unit 30 may comprehensively determine the turning angles of the left and right wheels for each of the front and rear rows or the turning angles of four wheels including the front and rear rows, and determine that the entire vehicle is in the vehicle straight traveling state. As described above, the control unit 201 corresponding to the wheels not only function independently but also is capable of executing control in cooperation with each other.

When the straight traveling determination unit 30 determines that the vehicle is in the vehicle straight traveling state, a straight traveling determination signal is turned on. When the straight traveling determination unit 30 determines that the vehicle is not in the vehicle straight traveling state, the straight traveling determination signal is turned off. Further, even when the straight traveling determination unit 30 determines that the vehicle is in the vehicle straight traveling state, the straight traveling determination signal is turned off when the vehicle speed V is less than the vehicle speed threshold V_th as indicated by the broken line (see FIG. 3). In this way, a requirement in a case where the straight traveling determination signal is exceptionally turned off even in the vehicle straight traveling state is referred to as an "application exclusion requirement". A case where the vehicle speed V is less than the vehicle speed threshold V_th corresponds to an example in which the vehicle satisfies the application exclusion requirement. ON/OFF of the straight traveling determination signal is notified to the gain selection units 46, 56.

Further, the control unit 201 has an integral gain map 43I of vehicle speed sensitivity and an integral gain map 53I of turning angle sensitivity. The integral gain map 43I of the vehicle speed sensitive stores a relationship between the vehicle speed V and the integral gain, and outputs the integral gain corresponding to the input vehicle speed V to the gain selection unit 46. The integral gain map 53I of the turning angle sensitive stores a relationship between the turning angle θt and the integral gain, and outputs the integral gain corresponding to the input turning angle θt to the gain selection unit 56.

The gain selection units 46, 56 select the integral gain input from the integral gain maps 43I, 53I respectively when the straight traveling determination signal is ON. This operation corresponds to "executing a responsiveness changing process". As the responsiveness changing process, the control unit 20 sets the integral term of the feedback control to be larger in the vehicle straight traveling state than in a vehicle non-straight traveling state. On the other hand, the gain selection units 46, 56 select, for example, "1" as a fixed gain when the straight traveling determination signal is OFF. This operation corresponds to "not executing the responsiveness changing process". The integration gains selected by the gain selection units 46, 56 are multiplied by the outputs of the integral controller 22I by the multipliers 24, 253I.

Figure 3:
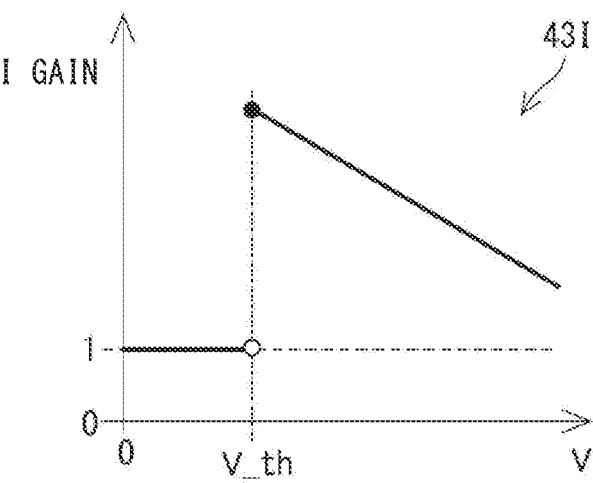
FIG. 3 is an example of a vehicle speed sensitive gain map of FIG. 2.

An example of the integral gain map 43I of the vehicle speed sensitivity and the gain map 53I of the turning angle sensitivity used in the present embodiment will be described with reference to FIGS. 3 and 4. Since a dynamic friction coefficient of a road surface decreases as the vehicle speed V increases, the integral term may be reduced. Therefore, as shown in FIG. 3, in a region where the vehicle speed V is equal to or greater than the vehicle speed threshold V_th, the integral gain is set to be smaller with increase in the vehicle speed V, in a range of 1 or more. That is, the control unit 20 sets the integral term of the feedback control to be smaller with increase in the vehicle speed V, in the responsiveness changing process in the vehicle straight traveling state. In a region where the vehicle speed V is less than the vehicle speed threshold V_th, the integration gain is set to 1. At this time, the feedback control is executed with the same responsiveness as the vehicle non-straight traveling state.

In addition, in the vehicle straight traveling state, the closer the turning angle θt is to the neutral position, the smaller the turning angle deviation Δθt becomes, and the output of the integral controller 22I also becomes smaller. In order to compensate for this, as shown in FIG. 4, in a region in which the absolute value |θt| of the turning angle is equal to or less than a threshold α, the integral gain is set to be larger in a range of 1 or more as it is closer to the neutral position (θt=0). That is, the control unit 20 sets the integral term of the feedback control to be larger as the turning angle θt is closer to the neutral position as the responsiveness changing process in the vehicle straight traveling state. The gain is set to 1 in a region where the turning angle θt is smaller than a negative threshold (−α) and in a region where the turning angle θt is larger than a positive threshold α.

By using the integral gain maps 43I, 53I of the above example, the control unit 20 sets the integral term of the feedback control to be larger in the vehicle straight traveling state than in the vehicle non-straight traveling state as the responsiveness changing process. In this manner, the control unit 20 executes the responsiveness changing process for each of the steering actuators 81 to 84 corresponding to the wheels 91 to 94, except for a case where the vehicle 900 satisfies a predetermined application exclusion requirement. That is, the control unit 20 changes the responsiveness of the feedback control so that the turning angle deviation Δθt is more likely to be smaller in the vehicle straight traveling state than in the vehicle non-straight traveling state.

Figure 5:
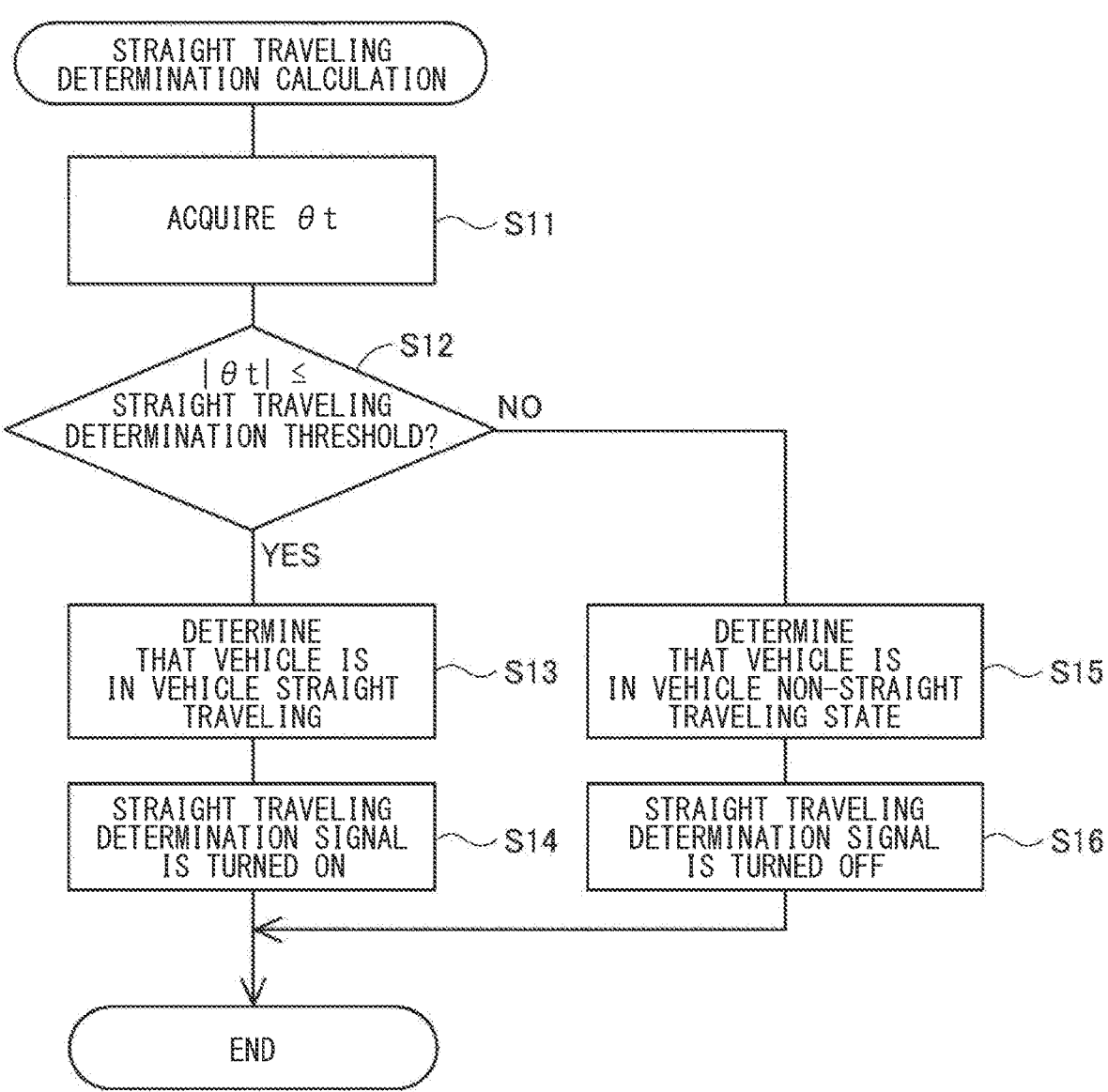
FIG. 5 is a flowchart showing processing of a straight traveling determination unit of FIG. 2.
Figure 6:
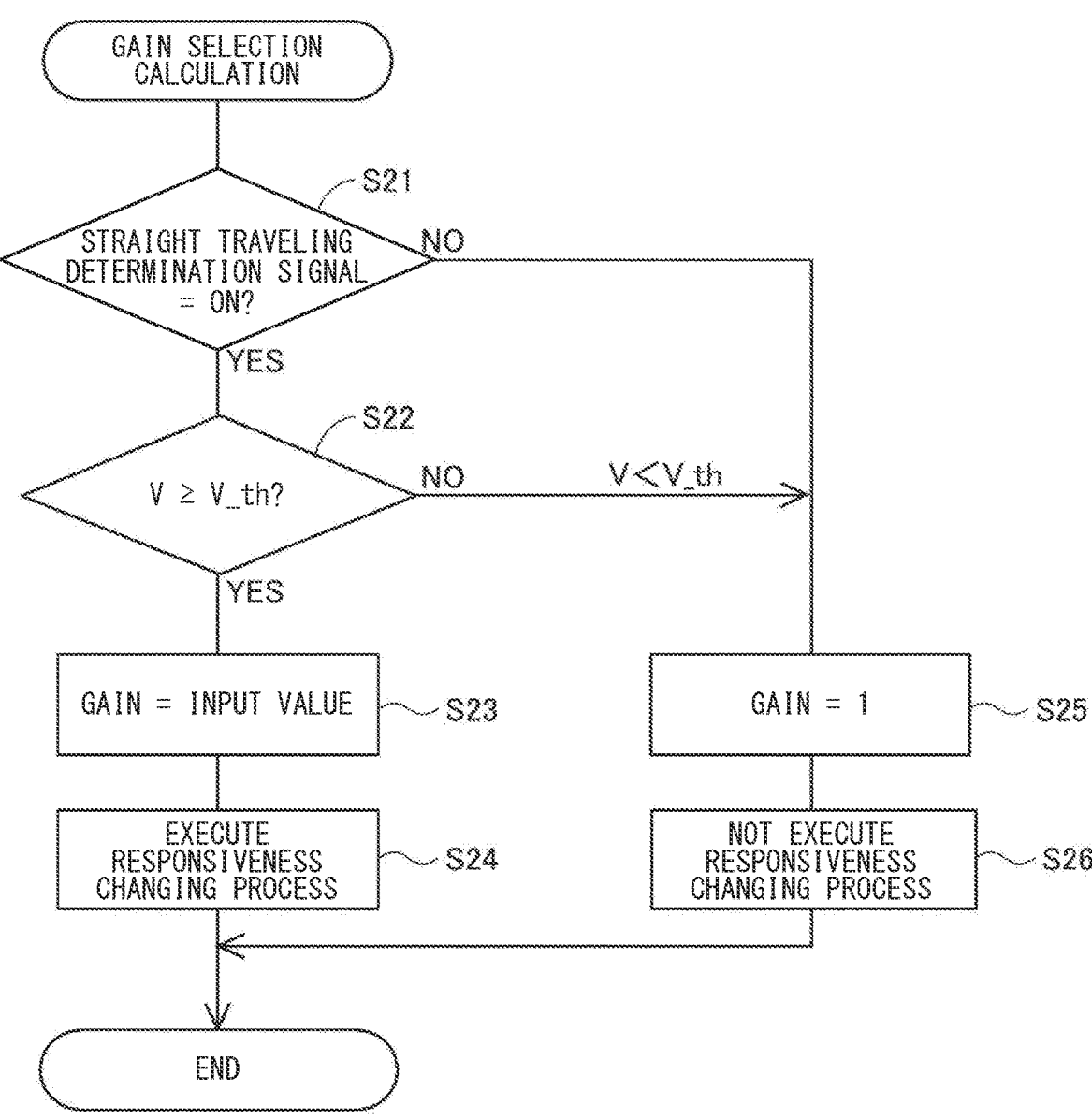
FIG. 6 is a flowchart showing processing of a gain selection unit in FIG. 2.

Referring to the flowcharts of FIGS. 5 and 6, the straight traveling determination calculation by the straight traveling determination unit 30 and the gain selection calculation by the gain selection units 46, 56 will be summarized. In the following flowchart, a symbol S indicates a step.

In step S11 of FIG. 5, the straight traveling determination unit 30 acquires the turning angle θt of each of the wheels 91 to 94. In step S12, it is determined whether the absolute value |θt| of the turning angle is equal to or less than the straight traveling determination threshold. If YES in step S12, the straight traveling determination unit 30 determines that the vehicle is in the vehicle straight traveling state in step S13, and the straight traveling determination signal is turned on in step S14. In the case of No in step S12, the straight traveling determination unit 30 determines that the vehicle is in the vehicle non-straight traveling state in step S15, and the straight traveling determination signal is turned off in step S16.

In step S21 of FIG. 6, it is determined whether the straight traveling determination signal is ON. If YES in step S21, it is determined in step S22 whether the vehicle speed V is equal to or greater than the vehicle speed threshold V_th as a satisfaction determination of the application exclusion requirement. If YES in step S22, that is, if the application exclusion requirement is not satisfied, the gain selection units 46, 56 select the input values from the gain maps 43I, 53I as the integral gain in step S23. Therefore, the responsiveness changing process is executed in step S24.

If NO in step S21, the process proceeds to step S25. On the other hand, when the vehicle speed V is less than the vehicle speed threshold V_th, it is determined as NO in step S22 since the application exclusion requirement is satisfied, and the process proceeds to step S25. In step S25, the gain selection units 46, 56 select "1" as the integral gain. Therefore, the responsiveness changing process is not executed in step S26. Therefore, the control unit 20 performs the feedback control with the same responsiveness in the vehicle straight traveling state as in the vehicle non-straight traveling state.

Figure 7:
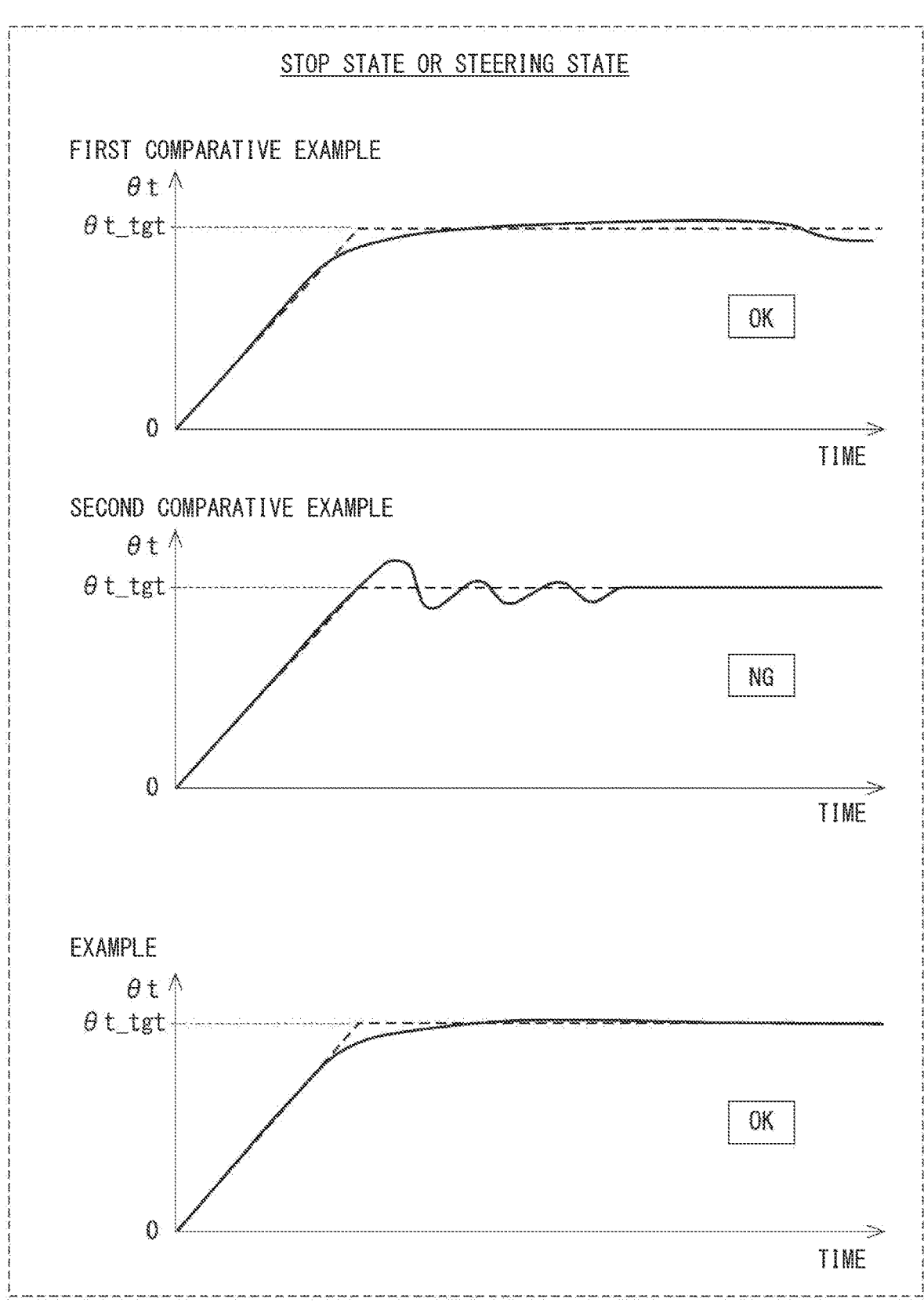
FIG. 7 is a diagram showing a control response of a turning angle at the time of stopping or at the time of steering according to a first comparative example, a second comparative example, and the present embodiment.
Figure 8:
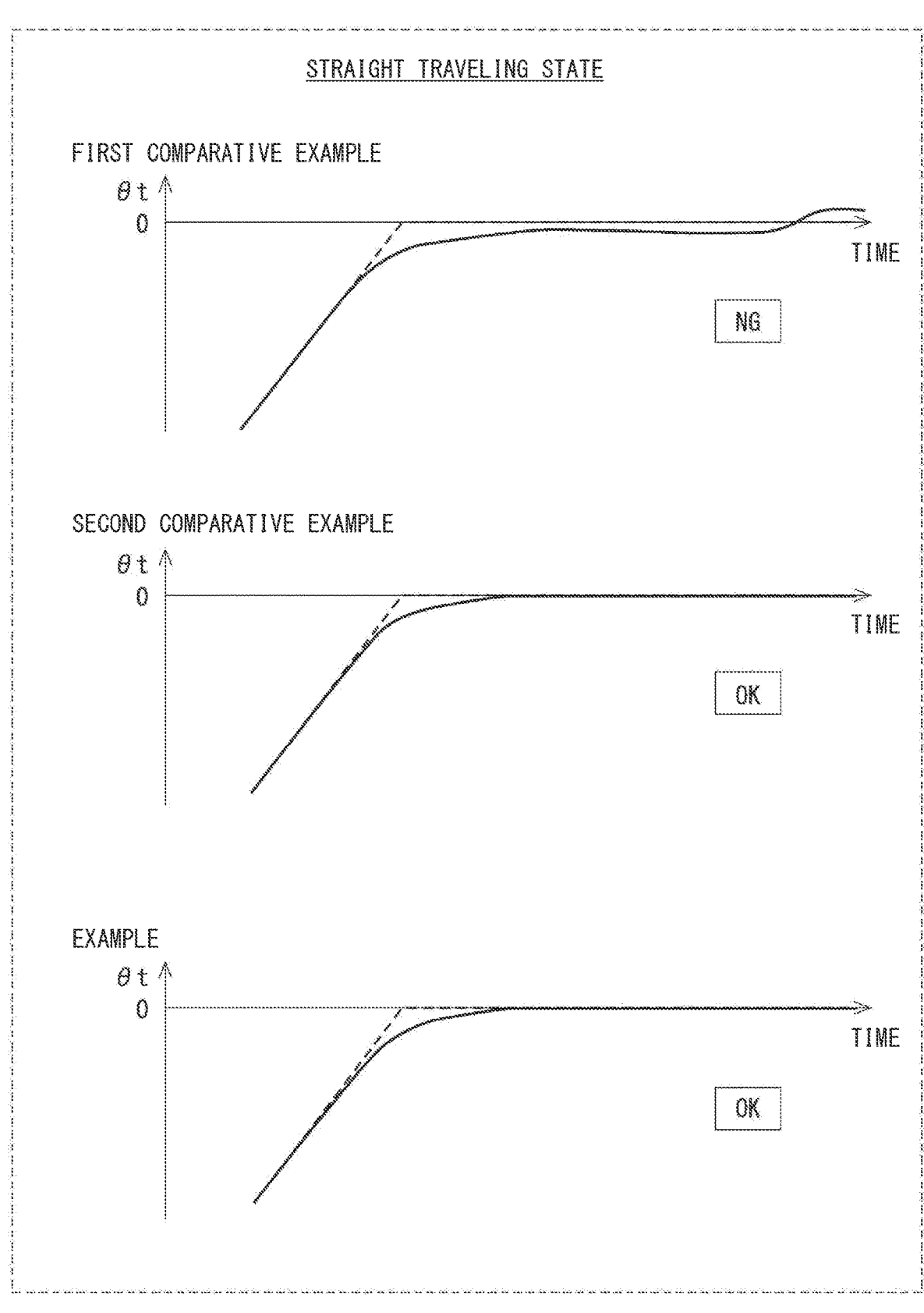
FIG. 8 is a diagram showing a control response of a turning angle during straight traveling according to a first comparative example, a second comparative example, and the present embodiment.

With reference to FIG. 7 and FIG. 8, effects of the present embodiment will be described in comparison with a control configuration of a comparative example in which the responsiveness of the feedback control is not changed between the vehicle straight traveling state and the vehicle non-straight traveling state. In a first comparative example, a gain of the turning angle control is set in accordance with a stop state or a steering state, that is, the vehicle non-straight traveling state. The stop state is assumed that the vehicle is parked in the parking lot while turning the steering wheel. The steering state is assumed to be a case where normal steering or sudden steering is performed at a relatively large steering angle such as a right turn, a left turn, or a lane change. On the other hand, in a second comparative example, a gain of the turning angle control is set in accordance with the straight traveling.

FIG. 7 shows a control response of the turning angle θt at the stop state or the steering state. The wheels are steered from the neutral position (θt=0) to the target turning angle θt_tgt. FIG. 8 shows a control response of the turning angle during the straight traveling. The wheels are steered from a position other than the neutral position to the neutral position (θt=0) and then held at the neutral position. Control responses to commands indicated by broken lines are indicated by solid lines in an upper part of each drawing for the first comparative example, in a middle part of each drawing for the second comparative example, and in a lower part of each drawing for the present embodiment. In FIGS. 7, 8, "OK" means that the responsiveness is good, and "NG" means that there is an issue in the responsiveness.

As shown in FIG. 7, there is no problem in responsiveness in the first comparative example at the time of stopping or steering. However, overshoot occurs in the second comparative example in which the gain is set to be relatively large in accordance with the straight traveling. In the present embodiment, since the responsiveness changing process is not executed at the time of stopping or steering, the occurrence of the overshoot is avoided, and appropriate responsiveness is obtained.

As shown in FIG. 8, during the straight running, there is no problem in the responsiveness in the second comparative example. However, in the first comparative example in which the gain is set to be relatively small in accordance with the stop state or the steering state, the turning angle deviation Δθt remains between the target turning angle θt_tgt and the actual turning angle θt. In the present embodiment, by increasing the integral gain by executing the responsiveness changing process during the straight traveling, the turning angle deviation Δθt decreases, and appropriate responsiveness is obtained.

As described above, in the present embodiment, the control unit 20 increases the integral gain and increases the integral term only when it is determined that the vehicle is in the vehicle straight traveling state, thereby changing the responsiveness of the feedback control so that the turning angle deviation Δθt tends to decrease. Thus, in the turning angle control of the four-wheel independently steering vehicle 900, the occurrence of the vehicle deflection at the time of the straight traveling can appropriately suppress while avoiding the vehicle from becoming unstable at the time of sudden steering or the like.

As shown in FIG. 3, the control unit 20 sets the integral term of the feedback control to be smaller as the vehicle speed V is higher, as the responsiveness changing process in the vehicle straight traveling state. Since the dynamic friction coefficient of the road surface decreases as the vehicle speed V increases, the state in which the turning angle deviation Δθt is small can be appropriately maintained even when the integral term is reduced.

Figure 4:
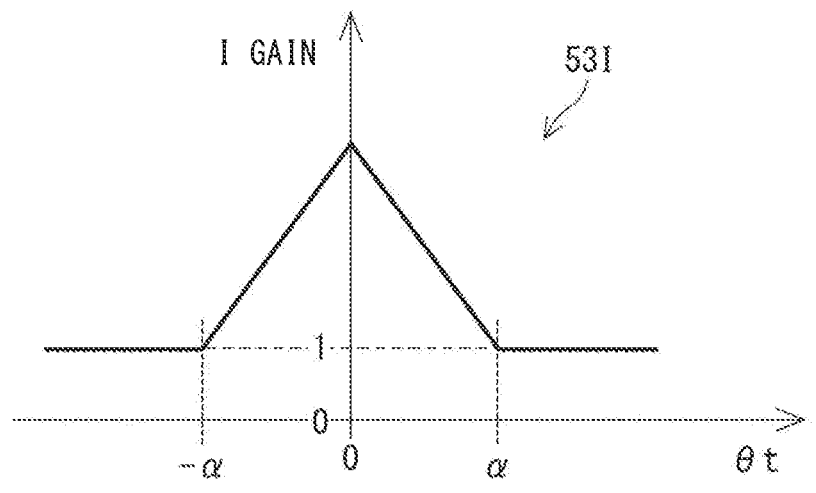
FIG. 4 is an example of a turning angle sensitive gain map of FIG. 2.

As shown FIG. 4, the control unit 20 sets, in the responsiveness changing process, the integral term of the feedback control to be larger with decrease in difference the turning angle θt and the neutral position in the vehicle straight traveling state. Thus, even when the turning angle deviation is small, a decrease can be suppressed in the integral term.

The control unit 20 of the present embodiment executes the responsiveness changing process independently for each steering actuators 81, 82 corresponding to the wheels 91 to 94. Therefore, the turning angle control can be performed suitable for characteristics of the four-wheel independently steering vehicle 900.

The straight traveling determination unit 30 of the control unit 20 determines that the vehicle is in the vehicle straight traveling state when the absolute value |θt| of the turning angle of each of the wheels 91 to 94 is equal to or less than the straight traveling determination threshold. Thus, it is possible to easily determine whether the vehicle is in the vehicle straight traveling state.

When the vehicle speed V is less than the vehicle speed threshold V_th as "a case where the vehicle satisfies the application exclusion requirement", the control unit 20 does not execute the responsiveness changing process and performs the feedback control with the same responsiveness as that in the vehicle non-straight traveling state in the vehicle straight traveling state. Since a driver is less likely to feel an occurrence of the vehicle deflection when traveling at a low speed, it is preferable not to execute excessive processing by excluding the responsiveness changing process.

Second Embodiment

Figure 9:
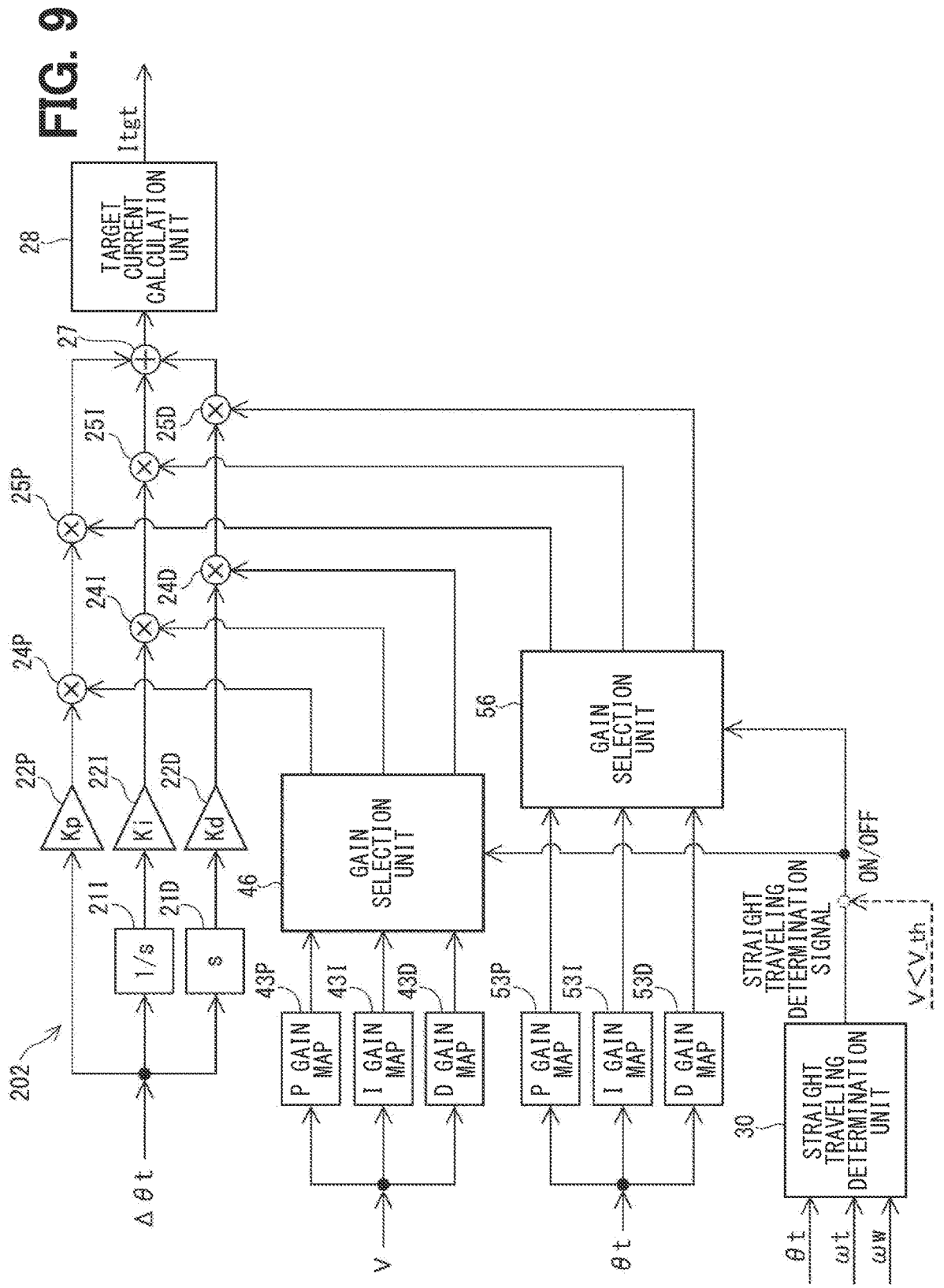
FIG. 9 is a configuration diagram showing a controller of the turning control device according to a second embodiment.

A Second embodiment will be described with reference to FIG. 9. In FIG. 9, substantially the same configuration as in FIG. 2 is designated by the same reference numerals and description thereof will be omitted. In FIG. 9, a proportional gain and a differential gain are referred to as "P gain" and "D gain", respectively. In the responsiveness changing process, a control unit 202 of the second embodiment changes a proportional term and a derivative term in addition to an integral term as a control term of the feedback control. Since a configuration relating to the change of the integral term is the same as that of the first embodiment, the description thereof will be omitted.

In addition to the configuration of the control unit 201 of the first embodiment, the control unit 202 of the second embodiment includes a vehicle speed sensitive proportional gain map 43P, a differential gain map 43D, a turning angle sensitive proportional gain map 53P, and a differential gain map 53D. The control unit 202 includes multipliers 24P, 25P that multiply the output of the proportional controller 22P by the proportional gain selected by the gain selection units 46, 56, and multipliers 24P and 25P that multiply the output of the differential controller 22D by the differential gain selected by the gain selection units 46, 56.

For example, with respect to the proportional gain of the turning angle response, in order to compensate for a decrease in the output of the proportional controller 22P when the turning angle deviation Δθt is small, the proportional term may be adjusted by increasing the proportional gain of the turning angle response as the position is closer to the neutral position. Similarly to the integral gain, the proportional gain of the vehicle speed sensitivity may be reduced in consideration of a fact that a friction of a road surface decreases as the vehicle speed V increases. In the case of changing the proportional gain, if the proportional gain is suddenly changed, the wheels may be suddenly operated to deteriorate the steering feeling. Therefore, a time change rate of the proportional gain may be limited and gradually changed.

The differential gain may be set to a value that does not cause vibration so that responsiveness to a change in the turning angle deviation Δθt is improved. In the case of the PI control not including the differential control, the control unit 202 may change only the integral term and the proportional term as the responsiveness changing processing.

In the second embodiment, the same actions and effects as those of the first embodiment can be obtained with respect to the change of the integral term in the responsiveness changing process. Further, in the second embodiment, by changing the proportional term and the differential term, the turning angle of each of the wheels 91 to 94 can be more finely controlled according to various states of the vehicle. Therefore, the occurrence of vehicle deflection can be more appropriately suppressed when the four-wheel independently steering vehicle 900 travels straight.

Other Embodiments (a) The "state parameter that can be converted into the turning angle" is not limited to the turning angle itself, and may be a rotation angle in a case where the steering actuators 81 to 84 is a motor, a stroke in a case where the steering actuator is a linear actuator, or the like. In this case, the "turning angle" in the above specification may be interpreted by being replaced with a generalized "state parameter". That is, the "turning angle deviation" is generalized to the "state parameter deviation", and the "target turning angle" is generalized to the "target value of the state parameter".

(b) In the above embodiment, the integral gain is set to a value larger than 1 when the responsiveness changing process is executed, and the integral gain is set to 1 when the responsiveness changing process is not executed. For example, the integral gain may be set to a value larger than 0 (for example, 1) when the responsiveness changing process is executed, and the integral gain may be set to 0 when the responsiveness changing process is not executed. That is, the integral term may not be used when the responsiveness changing process is not executed. Also in this configuration, as the responsiveness changing process, the control unit sets the integral term of the feedback control to be larger in the vehicle straight traveling state than in the vehicle non-straight traveling state. In addition, the control unit can change the responsiveness of the feedback control so that the turning angle deviation is more likely to be smaller in the vehicle straight traveling state than in the vehicle non-straight traveling state.

(c) In contrast to the gain map illustrated in FIGS. 3 and 4, a shape of the map is not limited to a straight polygonal line shape, and may be a step shape or a curved shape. In addition, a calculation may be performed by a mathematical expression without using the gain map.

(d) In the above embodiment, the responsiveness changing process is executed for each of the steering actuators 81 to 84 corresponding to each of the wheels 91 to 94. However, for example, the responsiveness changing process can be executed using an average value or the like of the state parameters of the two turning wheels for the left and right wheels in the front row or the rear row.

(e) As parameters of the responsiveness changing process, a slipperiness of the road surface, a road surface gradient, a strength and a direction of a wind acting on the vehicle, and the like may be considered in addition to the vehicle speed and the turning angle. For example, the slipperiness of the road surface is estimated from a detection value of the road surface friction coefficient or a difference between the wheel speed and the vehicle speed. When the road surface is slippery or inclined, when a strong crosswind is blowing, or the like, straightness of the vehicle is not maintained even if the responsiveness is increased in the first place, and thus the condition may be included in a case where the application exclusion requirement is satisfied.

The present disclosure is not limited to such embodiments but can be implemented in various forms without deviating from the spirit of the present disclosure.

The controller circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. A computer program may be stored in a computer-readable non-transitory tangible recording medium as an instruction executed by a computer.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A turning control device for a vehicle having four wheels that are mechanically separated and steered independently, the four wheels being left and right wheels of a front row and a rear row, the turning control device being configured to control four steering actuators corresponding to the four wheels, the turning control device comprising:

a controller configured to perform feedback control of the four steering actuators to reduce a deviation for each of the four wheels, the deviation being a difference between a state parameter convertible into a turning angle and a target value of the state parameter set according to steering of a steering wheel, wherein the controller is configured to execute a responsiveness changing process of changing a responsiveness of the feedback control so that the deviation is likely to be smaller in a vehicle straight traveling state than in a vehicle non-straight traveling state, except when the vehicle satisfies a predetermined application exclusion requirement.

2. The turning control device according to claim 1, wherein the controller is configured to set, in the responsiveness changing process, an integral term of the feedback control to be larger in the vehicle straight traveling state than in the vehicle non-straight traveling state.

3. The turning control device according to claim 2, wherein the controller is configured to set, in the responsiveness changing process, the integral term of the feedback control to be smaller with increase in vehicle speed in the vehicle straight traveling state.

4. The turning control device according to claim 2, wherein the controller is configured to set, in the responsiveness changing process, the integral term of the feedback control to be larger with decrease in difference between a turning angle and a neutral position in the vehicle straight traveling state.

5. The turning control device according to claim 1, wherein the controller is configured to execute the responsiveness changing process independently for each of the four steering actuators corresponding to the four wheels.

6. The turning control device according to claim 1, wherein the controller is configured to determine that the vehicle is in the vehicle straight traveling state when an absolute value of the state parameter is equal to or less than a straight traveling determination threshold.

7. The turning control device according to claim 1, wherein the application exclusion requirement includes a speed condition which is met when the vehicle speed is less than a vehicle speed threshold, and the controller is configured to perform the feedback control in the vehicle straight traveling state with the same responsiveness as that in the vehicle non-straight traveling state when the speed condition is met.

8. The turning control device according to claim 1, wherein the controller is configured to execute the responsiveness changing process of changing the responsiveness of the feedback control so that a fluctuation of the deviation is to be smaller in a vehicle straight traveling state than in a vehicle non-straight traveling state, except when the vehicle satisfies a predetermined application exclusion requirement.

* * * * *